United States Patent
Nakajima

(10) Patent No.: US 9,554,254 B2
(45) Date of Patent: Jan. 24, 2017

(54) COMMUNICATION APPARATUS, CONTROL METHOD OF COMMUNICATION APPARATUS, AND PROGRAM

(71) Applicant: CANON KABUSHIKI KAISHA, Tokyo (JP)

(72) Inventor: Takafumi Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 14/163,468

(22) Filed: Jan. 24, 2014

(65) Prior Publication Data

US 2014/0211774 A1    Jul. 31, 2014

(30) Foreign Application Priority Data

Jan. 25, 2013   (JP) ................. 2013-012139

(51) Int. Cl.
*H04L 12/26* (2006.01)
*H04W 4/08* (2009.01)

(52) U.S. Cl.
CPC ................... *H04W 4/08* (2013.01)

(58) Field of Classification Search
USPC ............ 370/229, 230, 236, 252, 328
See application file for complete search history.

(56) References Cited

U.S. PATENT DOCUMENTS

| | | | | |
|---|---|---|---|---|
| 8,693,038 B2* | 4/2014 | Suzuki | ............... | H04W 12/06 358/1.15 |
| 9,060,329 B2* | 6/2015 | Montemurro | | |
| 2011/0116415 A1* | 5/2011 | Naito | ............... | H04W 76/02 370/254 |
| 2012/0044815 A1* | 2/2012 | Geirhofer | ............ | H04W 72/082 370/248 |
| 2012/0314609 A1* | 12/2012 | Chang | ............... | H04B 7/15592 370/252 |
| 2014/0078928 A1* | 3/2014 | Verma | ............... | H04W 84/20 370/254 |
| 2014/0314065 A1* | 10/2014 | Song | ............... | H04W 8/005 370/338 |
| 2014/0355583 A1* | 12/2014 | Wang | ............... | H04W 4/08 370/338 |
| 2015/0126115 A1* | 5/2015 | Yun | ............... | H04L 63/0492 455/41.1 |
| 2015/0331650 A1* | 11/2015 | Moritomo | ............ | G06F 3/1292 358/1.15 |

FOREIGN PATENT DOCUMENTS

| | | |
|---|---|---|
| JP | 2009225060 A | 10/2009 |
| JP | 2011-035768 A | 2/2011 |

* cited by examiner

*Primary Examiner* — Kwang B Yao
*Assistant Examiner* — Nguyen Ngo
(74) *Attorney, Agent, or Firm* — Canon U.S.A., Inc. IP Division

(57) ABSTRACT

A communication apparatus forms a new network for executing a first communication service according to a partner apparatus for the first communication service in a case where the communication apparatus starts the first communication service while the communication apparatus and a partner apparatus for a second communication service are executing the second communication service.

24 Claims, 10 Drawing Sheets

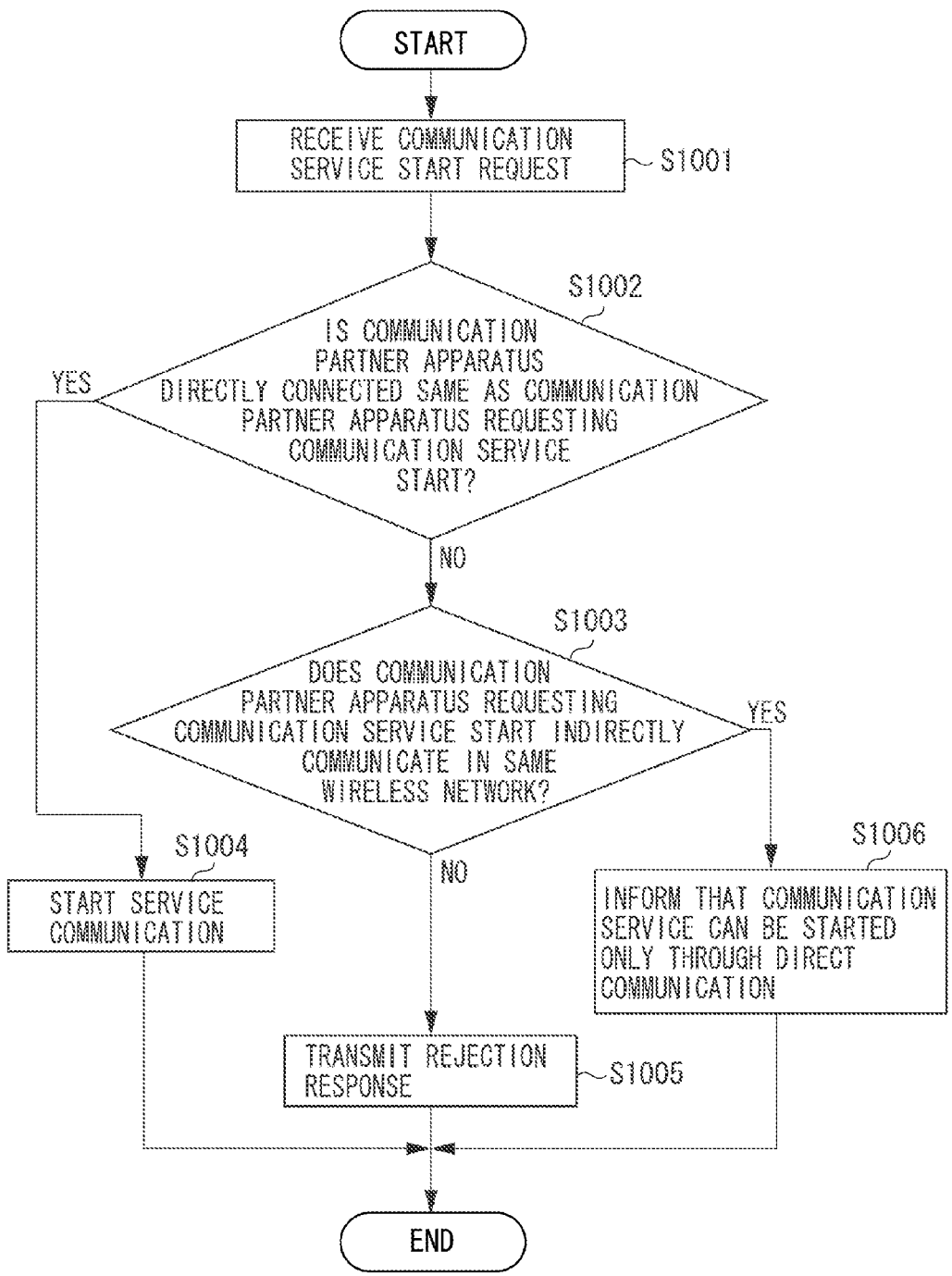

COMMUNICATION APPARATUS, CONTROL METHOD OF COMMUNICATION APPARATUS, AND PROGRAM

BACKGROUND OF THE INVENTION

Field of the Invention

The present invention relates to a communication apparatus, a control method of the communication apparatus, and a program.

Description of the Related Art

In recent years, wireless local area network (LAN) has been commonly provided for terminal apparatuses such as mobile phones, digital cameras, and printers in addition to personal computers (PCs). For example, Japanese Patent Application Laid-Open No. 2011-35768 discloses a method for easily sharing an image by employing a camera with a wireless LAN function.

An infrastructure mode in which terminals beneath a base station communicate with each other via the base station, and an ad hoc mode in which the terminals directly communicate with each other are provided as the connection modes of the wireless LAN apparatuses.

Although the base station is required for communicating in the infrastructure mode, there is provided a technique which enables the terminals to communicate with each other in the infrastructure mode even if the base station is not present in the communication environment. For the technique, the terminal includes a base station function so that the terminal can also operate as a base station.

Wi-Fi Alliance, that is, an industry association of the wireless LAN, standardizes Wi-Fi Direct which defines a specification for realizing direct communication between terminals by using a terminal that includes a base station function. A method for determining an apparatus operating as a base station, a method for setting parameters for the terminals to connect to the apparatus operating as the base station, and a connection method therefor are described in Wi-Fi Direct.

In Wi-Fi Direct, an apparatus that operates as the base station is defined as a group owner (GO), and a terminal apparatus that connects to the GO is defined as a Client. The terminal apparatus exchanges capability information with each other, so as to determine the apparatus that operates as a GO. The apparatus that is determined to be the GO activates a base station function to establish a wireless LAN network. By using Wi-Fi Protected Setup (WPS), each of the Clients executes wireless LAN parameter setting with respect to the wireless LAN network established by the GO in order to connect thereto. With this operation, the GO and the Clients form a wireless LAN network known as a peer-to-peer (P2P) group, so that the GO and the Clients can directly communicate through the wireless LAN in the P2P group.

Further, even before connecting through the wireless LAN network, it is possible to acquire service information of a communication partner apparatus by using a service discovery function specified in Wi-Fi Direct. The information of the service in an upper layer can be included in the service information.

However, in a case where the apparatus finds a communication partner apparatus for a desired service in a wireless layer section and randomly forms a P2P group with that communication partner apparatus, the apparatus may form a useless P2P group. For example, in a case where a connection is directly made through the wireless LAN, the apparatus may receive an instruction for starting a second service while the apparatus is executing a first service within one P2P group. At this time, the apparatus finds a communication partner apparatus through a Service Discovery for the second service, and newly forms another P2P group with that communication partner apparatus.

In such a case, if the communication partner apparatus for the first service is the same as the communication partner apparatus for the second service, the above operation is inefficient since the P2P groups are formed in an overlapping manner. The same can be also said if the communication partner apparatus for the second service is present in the P2P group in which the first service is being executed.

SUMMARY OF THE INVENTION

One purpose of the present invention is to provide a communication apparatus capable of executing a service in an efficient manner. For example, according to an aspect of the present invention, the communication apparatus includes a function for autonomously controlling the establishment of the network. Further, the communication apparatus is prevented from establishing the network in an overlapping manner. In addition, the communication apparatus controls execution of a service in the network.

Other purposes of the present invention will become apparent from the following description and drawings.

According to an aspect of the present invention, a communication apparatus includes a determination unit configured to determine a partner apparatus for a first communication service, and a formation unit configured to form a new network for executing the first communication service according to the partner apparatus for the first communication service in a case where the communication apparatus starts the first communication service while the communication apparatus and a partner apparatus for a second communication service are executing the second communication service.

Furthermore, the communication apparatus includes a determination unit configured to determine a partner apparatus for a first communication service, and an execution unit configured to execute the first communication service according to the partner apparatus for the first communication service and a partner apparatus for a second communication service in a case where the communication apparatus starts the first communication service while the communication apparatus and the partner apparatus for the second communication service are executing the second communication service.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a flowchart illustrating wireless network formation determination processing executed by the camera 101, the camera 102, and the printer.

DESCRIPTION OF THE EMBODIMENTS

Various exemplary embodiments, features, and aspects of the invention will be described in detail below with reference to the drawings.

Hereinafter, a first exemplary embodiment of the present invention will be described. The technical scope of the present invention is not limited to each of the embodiments described hereinafter, but is defined by the scope of the accompanying claims.

Figure 1:
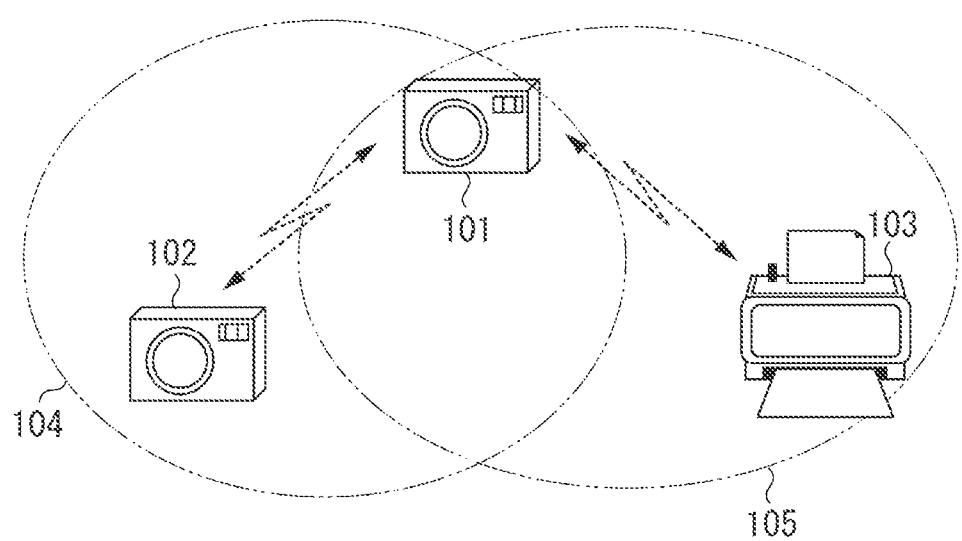
FIG. 1 is a diagram illustrating a configuration of a network.

FIG. 1 is a diagram illustrating a configuration of a network. The network illustrated in FIG. 1 is configured of a camera 101, a camera 102, and a printer 103.

A first wireless network 104 is a wireless LAN network established by the camera 101 and the camera 102. A second wireless network 105 is a wireless LAN network established by the camera 101 and the printer 103.

The camera 101, the camera 102, and the printer 103 have a wireless LAN function compliant with the Institute of Electrical and Electronics Engineers (IEEE) 802.11 standard. Further, the camera 101, the camera 102, and the printer 103 have a Wi-Fi Direct function to support the communication processing based on a Wi-Fi Direct protocol.

The camera 101, the camera 102, and the printer 103 form the first wireless LAN network 104 and the second wireless LAN network 105 by using the Wi-Fi Direct function. The camera 101, the camera 102, and the printer 103 automatically determine whether to participate in the wireless network as a station, or to establish the wireless network as an access point (base station) by performing the communication processing based on the Wi-Fi Direct protocol. Then, the camera 101, the camera 102, and the printer 103 operate in any one of the determined functions (station function or base station function) to wirelessly connect thereto and communicate with each other.

In Wi-Fi Direct, the access point (base station) is referred to as "group owner (GO)". However, in the present exemplary embodiment, the access point is referred to as "base station". Further, in Wi-Fi Direct, the station is referred to as "Client". However, in the present exemplary embodiment, the station is referred to as "station" or "terminal".

In a case where the apparatuses connect to each other by using Wi-Fi Direct, the base station provides the stations with a communication parameter so that the apparatuses connect to each other by using the communication parameter. The communication parameter includes various kinds of wireless communication parameters that cause the apparatuses to perform wireless communication compliant with the IEEE 802.11 standard. In other words, the communication parameter includes wireless communication parameters such as a service set identifier (SSID) as a network identifier, an encryption method, an encryption key, an authentication method, and an authentication key, which are necessary to perform the wireless LAN communication. Furthermore, the communication parameter includes an internet protocol (IP) address for the communication in an IP layer.

Further, the apparatus has a search signal transmission function and a response function. In the search signal transmission function, the apparatus transmits a search signal in a wireless frame in order to search for a communication partner apparatus for the service to be started. In the response function, the apparatus transmits a response upon receipt of the search signal. Before connecting to the wireless LAN network, the apparatus can acquire the search signal transmission function and the response function by employing the service discovery function specified in Wi-Fi Direct. However, the search signal transmission function and the response function for the apparatus to search for the communication partner apparatus are not limited to the above, and thus other units can be employed to realize the functions thereof.

Figure 2:
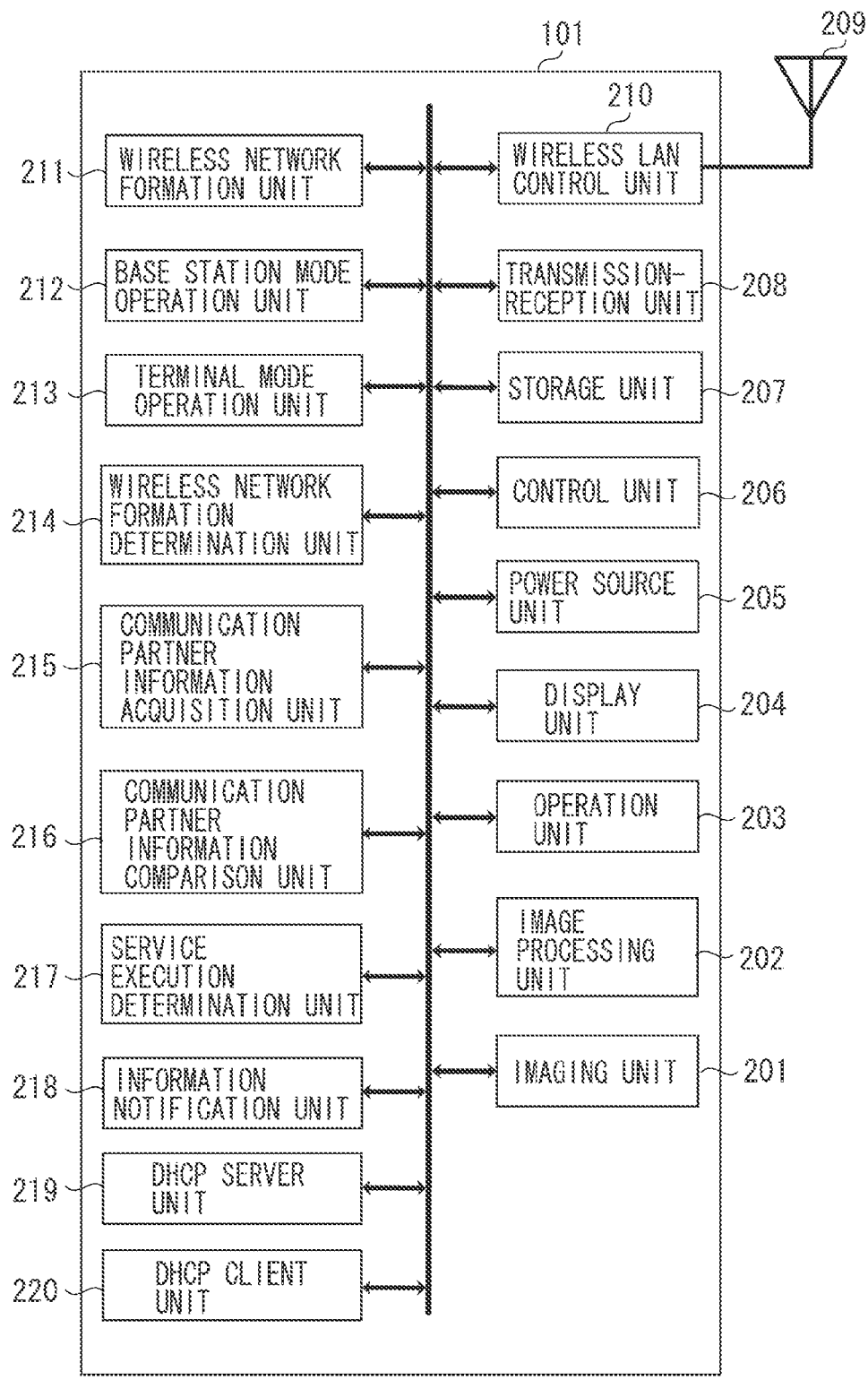
FIG. 2 is a block diagram illustrating a configuration of a camera 101 or 102.

FIG. 2 is a block diagram illustrating an example of an internal configuration of the camera 101 or 102. A reference numeral 101 denotes an entire camera. An imaging unit 201 of the camera 101 includes a charge-coupled device (CCD) and a lens. An image processing unit 202 executes image processing of an image captured by the imaging unit 201. An operation unit 203 includes operation buttons for operating the camera 101. A display unit 204 displays various kinds of information and is constituted by, for example, a liquid crystal display (LCD) or a light emitting diode (LED). The display unit 204 outputs the information that can be recognized visually.

A power source unit 205 supplies power to the camera 101. A control unit 206 executes a control program stored in a storage unit 207 to control the entire camera 101. The storage unit 207 stores various kinds of information such as the control program executed by the control unit 206, communication parameters for the wireless LAN, and information about communication partner apparatus. Respective operations described below will be executed when the control unit 206 executes the control program stored in the storage unit 207.

A transmission-reception unit 208 performs transmission-reception control according to a communication data protocol. An antenna 209 serves as an antenna for the wireless LAN communication. A wireless LAN control unit 210 includes a driver for performing various kinds of wireless LAN control compliant with the IEEE 802.11 series, and performs radiofrequency (RF) control of the wireless LAN and wireless LAN communication processing. In addition, the wireless LAN control unit 210 also performs protocol processing and driver control relating to Wi-Fi Direct.

A wireless network formation unit 211 performs processing for forming a wireless network (P2P group) and operates in either a base station mode or a terminal mode. A base station mode operation unit 212 operates as a base station in the wireless LAN when the camera 101 is operating as a GO in Wi-Fi Direct. A terminal mode operation unit 213 operates as a terminal in the wireless LAN or a Client in Wi-Fi Direct.

A wireless network formation determination unit 214 determines whether to form a new wireless network. A communication partner information acquisition unit 215 acquires information relating to a communication partner apparatus for the service performed by its own device (the camera 101). The communication partner information acquisition unit 215 acquires service information by using the service discovery function of Wi-Fi Direct or the function corresponding thereto. Further, the communication partner information acquisition unit 215 acquires identification information of the communication partner, and information of the wireless network in which the communication partner is present.

A communication partner information comparison unit 216 makes comparison between the communication partner information by using communication partner information of a plurality of services. A service execution determination unit 217 identifies the communication service executed in the P2P group managed thereby, and determines whether a plurality of services is being executed. An information notification unit 218 performs processing for notifying other apparatus of the service information of its own device (the camera 101).

A dynamic host configuration protocol (DHCP) server unit 219 performs IP address allocation processing with respect to the Client that connects to the wireless LAN network when the camera 101 is operating in the base station mode. A DHCP Client unit 220 performs IP address acquisition processing with respect to the base station in the wireless LAN network when the camera 101 is operating in the terminal mode.

Figure 3:
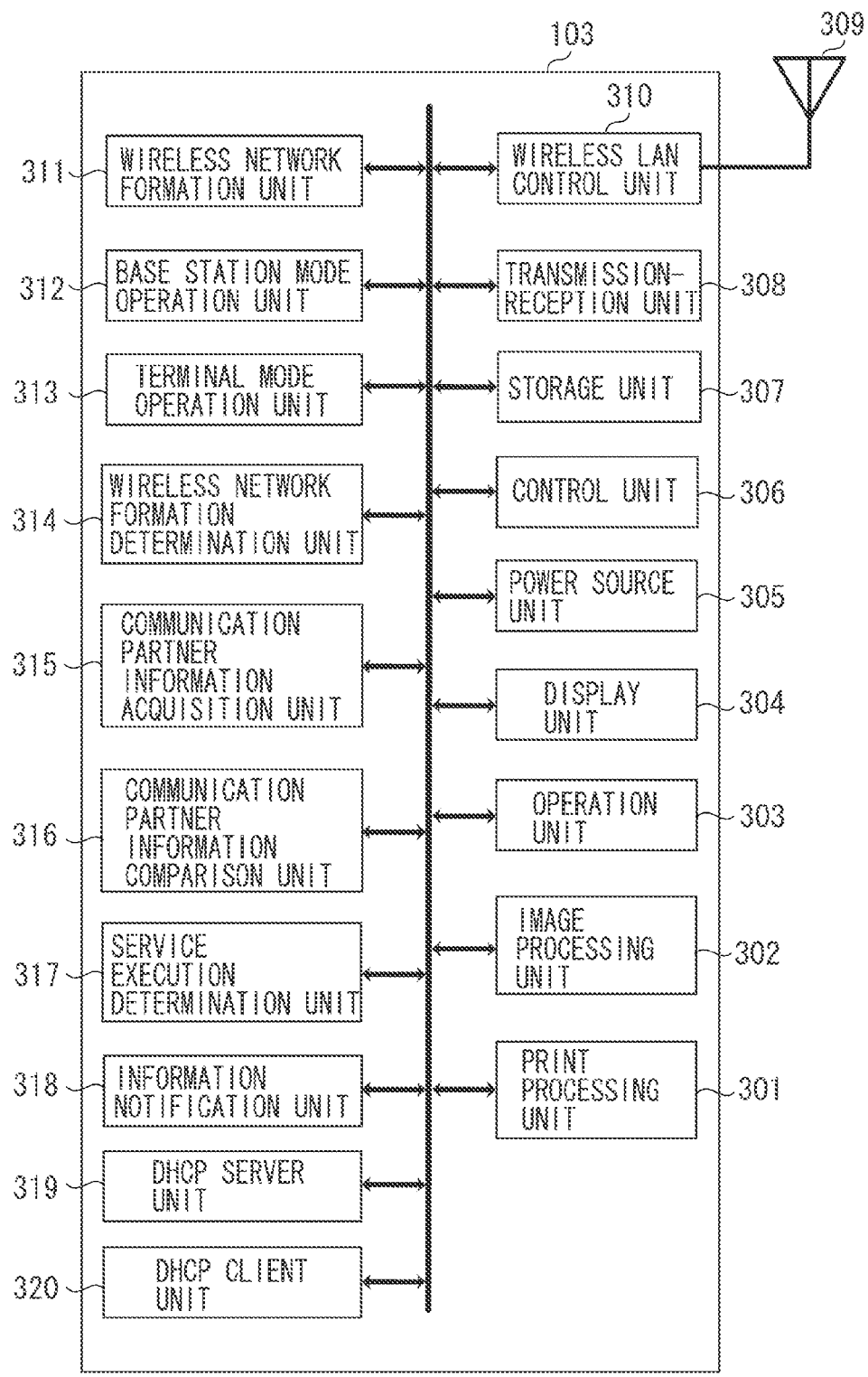
FIG. 3 is a block diagram illustrating a configuration of a printer.

FIG. 3 is a block diagram illustrating an example of an internal configuration of the printer 103. A reference numeral 103 denotes an entire printer. A print processing unit 301 performs print processing based on a print instruction. The print processing also includes processing for feeding and discharging sheets. The printer 103 is operated through an operation unit 303. The operation unit 303 includes operation buttons through which an instruction is input to the printer 103. A display unit 304 displays various kinds of information and is constituted by, for example, an LCD or an LED. The display unit 304 outputs information that can be recognized visually.

A power source unit 305 supplies power to the printer 103. A control unit 306 executes a control program stored in a storage unit 307 to control the entire printer 103. The storage unit 307 stores the control program executed by the control unit 306. Each of operations described below will be executed when the control unit 306 executes the control program stored in the storage unit 307. Each of units 308 through 320 is the same as those units 208 through 220 of the camera 101 or 102, and thus the description thereof will be omitted.

Each of the above-described function blocks merely represents one example, and thus a plurality of the function blocks may be configured as a single function block, or any of the function block may be divided and configured as a plurality of function blocks. Further, each of the function blocks may be configured of either a hardware device or a software program.

The processing performed in the present exemplary embodiment will be described with reference to FIGS. 4 through 8.

Figure 4:
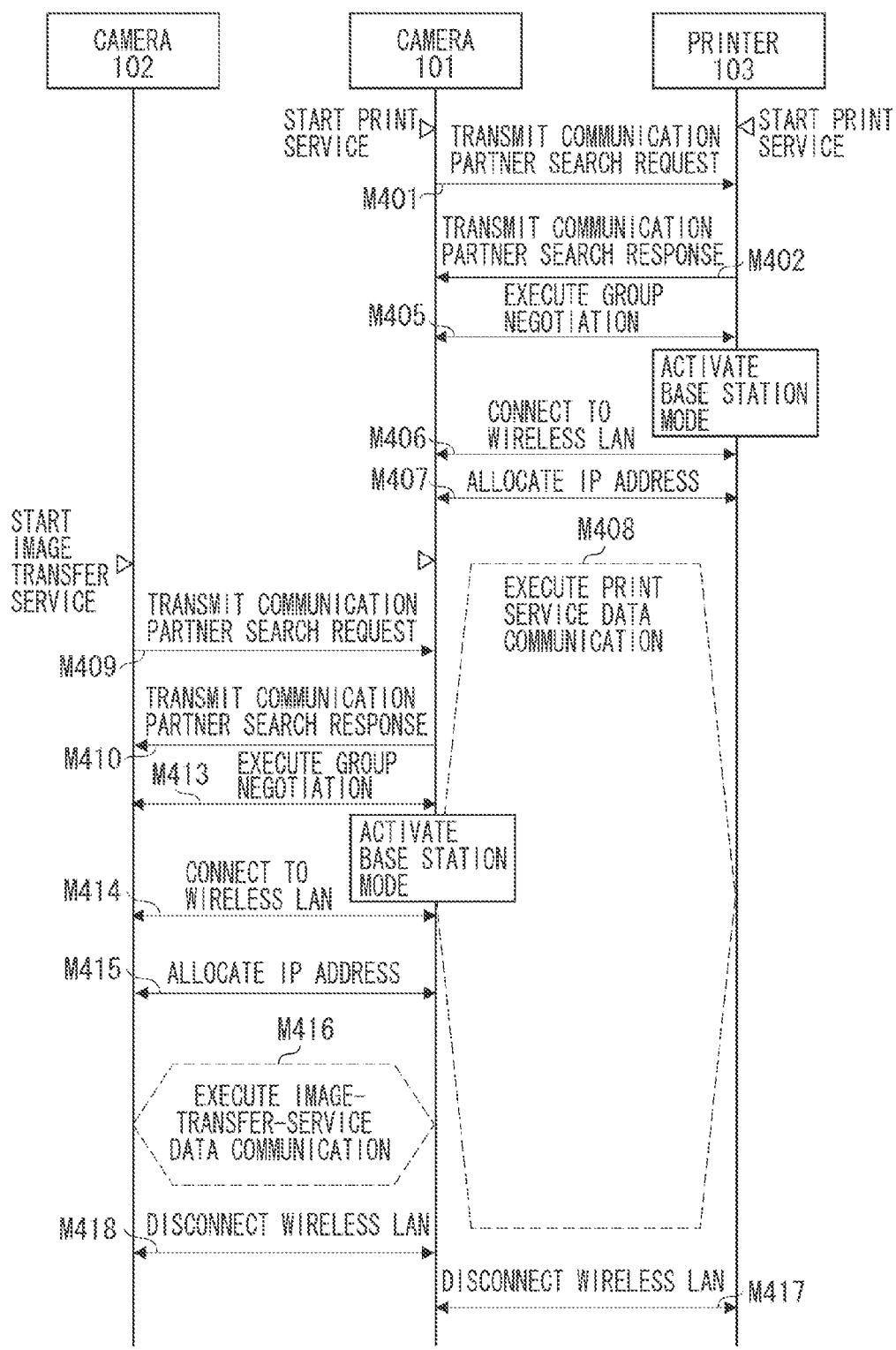
FIG. 4 is a sequence diagram illustrating respective communication services executed by the camera 101, the camera 102, and the printer.

FIG. 4 is a sequence diagram of respective service communications performed among the camera 101, the camera 102, and the printer 103 according to the present exemplary embodiment.

Figure 5:
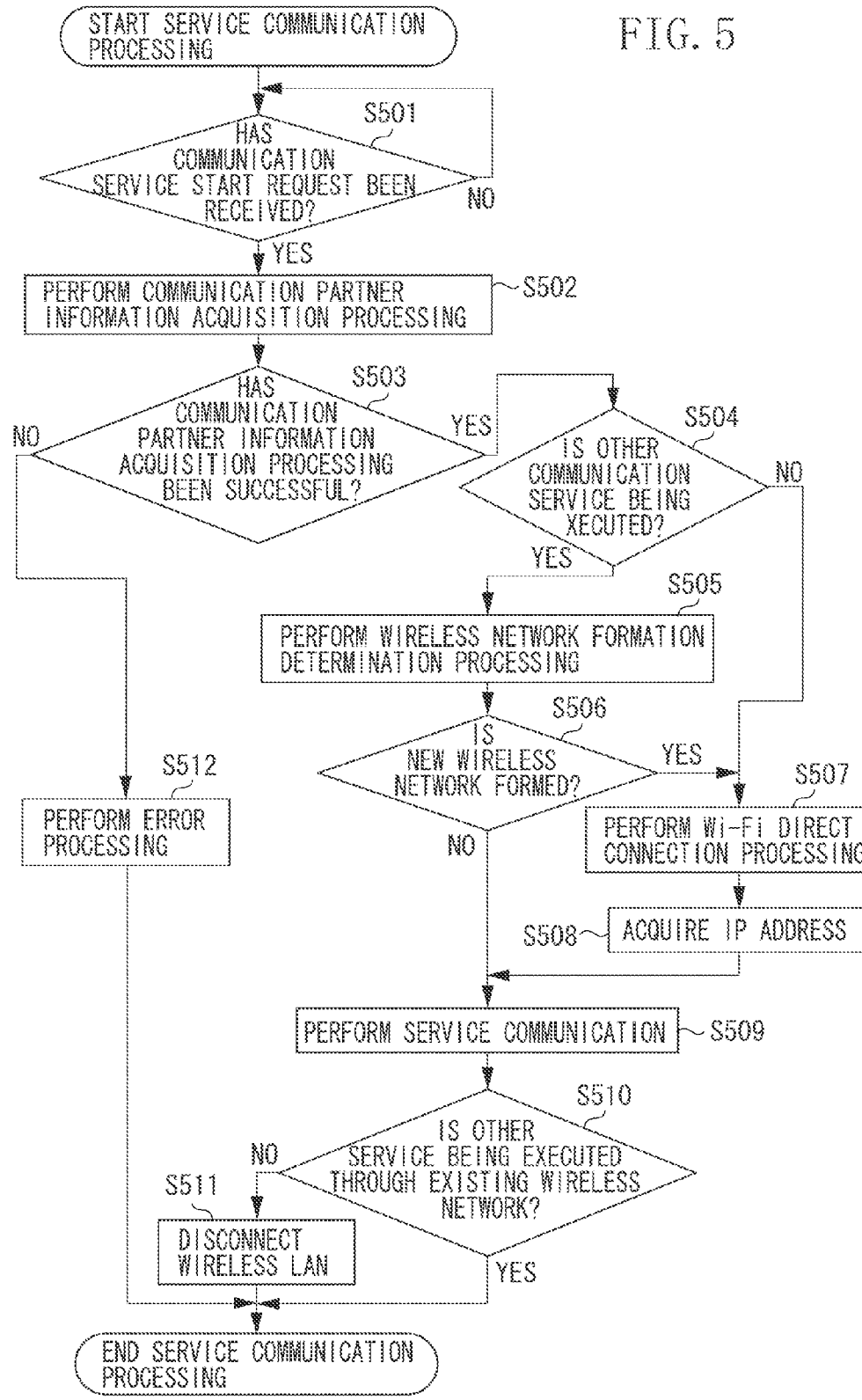
FIG. 5 is a flowchart illustrating service communication processing executed by the camera 101, the camera 102, and the printer.

FIG. 5 is a flowchart illustrating service processing performed by the camera 101, the camera 102, and the printer 103 according to the present exemplary embodiment.

Figure 6:
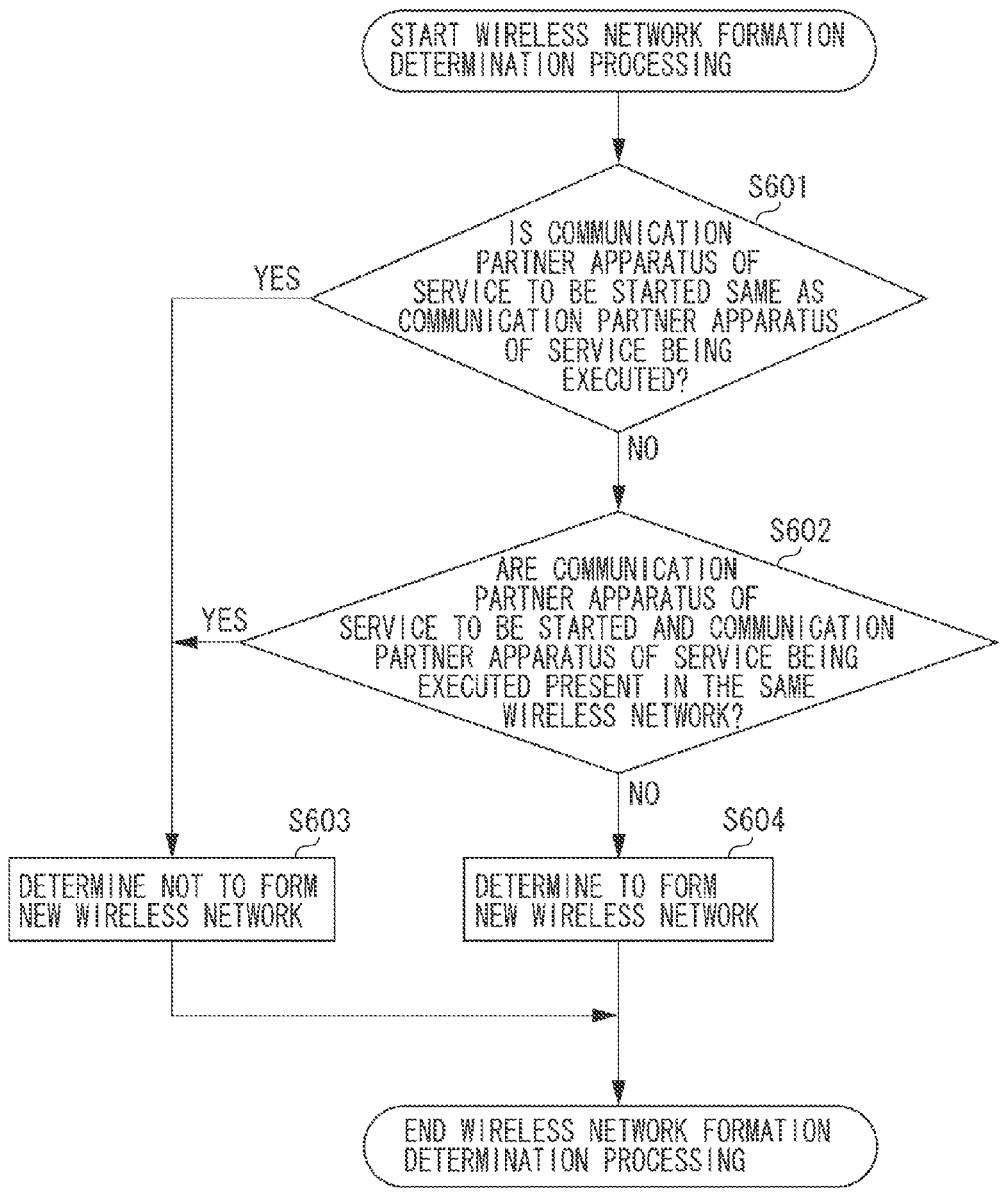
FIG. 6 is a flowchart illustrating wireless network formation determination processing executed by the camera 101, the camera 102, and the printer.

FIG. 6 is a flowchart illustrating wireless network formation determination processing performed by the camera 101, the camera 102, and the printer 103 according to the present exemplary embodiment.

First, the camera 101 and the printer 103 receives an instruction for starting the print service from a user. The camera 101 and the printer 103 perform the print processing when the user operates the operation units 203 and 303. Hereinafter, the service accompanied by communication may be described as "communication service". For example, the print service and the image transfer service are respectively described "communication service" since the services are accompanied by the communication between the apparatuses.

In step S501, if the camera 101 and the printer 103 receive a request for starting the communication service (print service) (YES in step S501), the camera 101 and the printer 103 advance the processing to step S502. In step S502, the communication partner information acquisition units 215 and 315 perform acquisition processing for acquiring the information of the communication partner for the communication service to be started. In the acquisition processing, information indicating the communication service to be started and an acquisition request signal for requesting a notification of the communication partner information are transmitted to the communication partner. The communication partner receives the acquisition request signal, and returns a response signal that includes its own information.

In the present exemplary embodiment, the communication partner information acquisition units 215 and 315 employ the service discovery function of Wi-Fi Direct in order to perform the communication partner information acquisition processing. The camera 101 transmits a service discovery query in M401 and the printer 103 responds thereto with a service discovery response in M402. By performing the communication partner information acquisition processing using the service discovery function, an apparatus that performs the print service can be identified.

The communication partner information includes various kinds of information such as a media access control (MAC) address, a universally unique identifier (UUID), a device type, a P2P group ID, P2P group Client information, service set identifier (SSID) information as a network identifier, a communication channel, a virtual address, a device name, a session ID, and a port number. The communication partner information comparison units 216 and 316 compare between all or a part of the above information. Based on the above comparison processing, the wireless network formation determination units 214 and 314 determine whether the communication partner and own apparatus are present in the same network.

Further, the wireless network formation determination units 214 and 314 determine whether the communication partner is present in the same network as that of its own apparatus to communicate directly. Furthermore, the wireless network formation determination units 214 and 314 determine whether the communication partner communicates indirectly via the group owner instead of communicating directly although the communication partner is present in the same network as that of its own apparatus. In addition, the wireless network formation determination units 214 and 314 determine whether the communication partner is present in the network other than that of its own apparatus.

The camera 101 recognizes that the printer 103 is performing the print service, and the printer 103 also recognizes that the camera 101 is performing the print service. When the communication partner information acquisition processing has been completed, the processing proceeds to step S503. In step S503, the communication partner information acquisition units 215 and 315 determine whether the acquisition of the communication partner information has been successful. In a case where the communication partner information cannot be acquired (NO in step S503), the processing proceeds to step S512. In step S512, the camera 101 and the printer 103 perform error processing by displaying and notifying error messages, and end the service communication processing.

In a case where the acquisition of the communication partner information has been successful (YES in step S503), the processing proceeds to step S504. In step S504, the service execution determination units 217 and 317 determine whether another service is being executed. In a case where another service is being executed (YES in step S504), the processing proceeds to step S505. In a case where another service is not being executed (NO in step S504), the processing proceeds to step S507. In addition, the processing may also proceed to step S505 in a case where another service has not been executed but will be executed. Likewise, the processing may proceed to step S505 in a case where the execution of another service has not been completed but suspended because of a sleep mode of a power saving operation.

Furthermore, in step S504, the service execution determination units 217 and 317 may make a determination on whether the wireless network has been formed (or will be formed) for another service. In such a case, if the wireless network has been formed or will be formed for another service (YES in step S504), the processing proceeds to step S505. If the wireless network has not been formed or will not be formed for another service (NO in step S504), the processing proceeds to step S507. In the present exemplary embodiment, the processing proceeds to step S507 since both the camera 101 and the printer 103 are not executing another service at this moment.

In step S507, Wi-Fi Direct connection processing is performed. The wireless network formation unit 211 (311) determines the relevant apparatus as the GO by performing group negotiation and the Client performs processing for connecting to the wireless LAN network established by the GO. In the present exemplary embodiment, the printer 103 is determined to be the GO. Therefore, the printer 103 is controlled by the base station mode operation unit 312 to be activated in the base station mode and establishes the wireless LAN network 105. In M406, the camera 101 is controlled by the terminal mode operation unit 213 to connect to the wireless LAN network 105 as a Client.

In the Wi-Fi Direct connection processing, the printer 103 operating as the base station provides the camera 101 with a communication parameter that is necessary to connect to the wireless LAN network 105. The camera 101 uses the communication parameter received from the printer 103 to connect to the wireless LAN network 105. When the camera 101 connects thereto, authentication processing will be executed using the authentication method and the authentication key specified by the communication parameter. Further, after the camera 101 has connected thereto, the camera 101 and the printer 103 perform cryptographic communication by using the encryption method and the encryption key specified by the communication parameter.

When the Wi-Fi Direct connection processing is completed, the processing proceeds to step S508. In step S508, the camera 101 and the printer 103 perform the IP address acquisition processing in M407. In the present exemplary embodiment, allocation of the IP address using a DHCP is performed in the IP address acquisition processing. The GO that operates in the base station mode is controlled by the DHCP server unit 219 (319) to perform the IP address allocation processing by employing a DHCP server function. The Client that operates in the terminal mode is controlled by the DHCP Client unit 220 (320) to perform the IP address allocation processing by employing a DHCP Client function. After performing the IP address acquisition processing, the processing proceeds to step S509. In step S509, the camera 101 and the printer 103 are controlled by the control units 206 and 306 to perform service communication. In the present exemplary embodiment, in M408, the camera 101 and the printer 103 perform the print service in which the printer 103 prints an image within the camera 101.

Subsequently, while the camera 101 and the printer 103 are executing the print service, the camera 101 and the camera 102 start an image transfer service in order to transfer the image from the camera 101 to the camera 102.

In the same manner as described above, both the camera 101 and the camera 102 start the service communication processing (image transfer service processing) illustrated in FIG. 5.

After the camera 102 has completed the processing in steps S501 through S503, the processing proceeds to step S504. In step S504, the service execution determination unit 217 (317) performs the determination processing for determining whether another service is being executed, and determines that the print service is being executed (YES in step S504). Therefore, the processing proceeds to step S505.

In step S505, the wireless network formation determination unit 214 (314) performs determination processing for determining whether to form a new wireless network. The wireless network formation determination processing will be described with reference to FIG. 6.

First, in step S601, the wireless network formation determination unit 214 (314) determines whether the communication partner apparatus for the service to be started and the communication partner apparatus for the service being executed are the same. If the communication partner apparatus for the service to be started and the communication partner apparatus for the service being executed are the same (YES in step S601), the processing proceeds to step S603. If the communication partner apparatus for the service to be started and the communication partner apparatus for the service being executed are not the same (NO in step S601), the processing proceeds to step S602. In order to identify the communication partner apparatus, the communication partner information acquired through the communication partner information acquisition processing in step S502 is used. The communication partner information has already been described in the above. The MAC address can be taken as an example of the identifier of the communication apparatus.

Because the wireless frame transmitted by the service discovery response includes the MAC address of the communication partner apparatus, the MAC address and the communication service information are registered linking with each other. However, the identification method of the communication partner apparatus is not limited to the above, and any method may be employed as long as the communication partner apparatus can be uniquely identified. The communication partner information comparison unit 216 (316) compares the information of the communication partner for the service being executed with the information of the communication partner for the service to be started. For example, the communication partner information comparison unit 216 (316) compares the MAC addresses. As a result of the above comparison, in a case where the MAC addresses are the same, and the communication partner of the service being executed and the communication partner of the service to be started are the same (YES in step S601), the processing proceeds to step S603. In a case where the MAC addresses and the communication partners are not the same (NO in step S601), the processing proceeds to step S602.

In step S602, based on the acquired communication partner information, the wireless network formation determination unit 214 (314) determines whether the communication partner apparatus for the service to be started and the communication partner apparatus for the service being executed are present in the same wireless network. In a case where the communication partner apparatus for the service to be started and the communication partner apparatus for the service being executed are present in the same wireless network (YES in step S602), the processing proceeds to step S603. In a case where the communication partner apparatus for the service to be started and the communication partner apparatus for the service being executed are not present in the same wireless network (NO in step S602), the processing proceeds to step S604. Further, in step S602, the wireless network formation determination unit 214 (314) may determine whether the communication partner apparatus for the service to be started is present in the wireless network in which the communication partner apparatus for the service being executed is present.

In the present exemplary embodiment, since the camera 101 serving as the communication partner apparatus for the service to be started is not the same as the printer 103 serving as the communication partner apparatus for the service being executed, the processing proceeds to step S602.

In order to determine whether the communication partner apparatus for the service to be started and the communication partner apparatus for the service being executed are present in the same wireless network, the communication apparatus uses an identifier of the communication partner apparatus for the service to be started, and employs a search function to search the wireless network where the communication partner apparatus for the service being executed is present. The search processing can be realized by employing an address resolution protocol (ARP) as a search function. In the present exemplary embodiment, an ARP request will be transmitted through the wireless LAN network 105 by using the MAC address of the camera 101 to determine whether the camera 101 is included in the wireless LAN network 105. In the present exemplary embodiment, since the camera 101 is not included in the wireless LAN network 105, the wireless network formation determination unit 214 (314) determines that the communication partner apparatus for the service to be started and the communication partner apparatus for the service being executed are not present in the same wireless network (NO in step S602), and thus the processing proceeds to step S604. The search function is not limited to the above and other search protocols may be used as long as the determination processing in step S602 can be performed.

In step S604, the wireless network formation determination unit 214 (314) determines that a new wireless network is formed for the service to be started, and ends the wireless network formation determination processing. If the processing proceeds to step S603, the wireless network formation determination unit 214 (314) determines that a new wireless network is not formed, and ends the wireless network formation determination processing.

After the wireless network formation determination processing has been completed, the processing proceeds to step S506. In step S506, the wireless network formation determination unit 214 (314) makes a determination on whether to form a new wireless network based on the result acquired from the wireless network formation determination processing. In a case where it is determined that the new wireless network is to be formed (YES in step S506), the processing proceeds to step S507. In step S507, the wireless network formation unit 211 (311) performs the Wi-Fi Direct connection processing to form a new wireless network.

In the present exemplary embodiment, the camera 101 determines that a new wireless network is to be formed and performs the Wi-Fi Direct processing.

As for the camera 102, after ending the processing in steps S501 through S503, in step S504, the service execution determination unit 217 determines that the camera 102 is not executing another service (NO in step S504). Therefore, the camera 102 advances the processing to step S507 to perform the Wi-Fi Direct connection processing.

In the present exemplary embodiment, the camera 101 and the camera 102 start the Wi-Fi Direct processing to perform the group negotiation in M413, and make a determination that the camera 101 operates as a GO. After ending the group negotiation, the camera 101 operates as a base station to establish the wireless LAN network 104. The camera 102 connects to the wireless LAN network 104 as a Client in M414. Since the camera 101 is communicating with the printer 103 through the wireless LAN network 105, the wireless LAN network 104 is established in the same wireless channel as that of the wireless LAN network 105. However, if the camera 101 has a plurality of wireless LAN interfaces (RF), the wireless channel is not limited to the above.

In the Wi-Fi Direct connection processing, the camera 101 operating as the base station provides the camera 102 with the communication parameter necessary to connect to the wireless LAN network 104. The camera 102 uses the communication parameter received from the camera 101 to connect to the wireless LAN network 104. When the camera 102 connects thereto, authentication processing will be executed using the authentication method and the authentication key specified by the communication parameter. Further, after the camera 102 has connected thereto, the camera 101 and the camera 102 perform cryptographic communication using the encryption method and the encryption key specified by the communication parameter.

After connecting to the wireless LAN network 104, in step S508, the camera 101 activates the DHCP server function while the camera 102 activates the DHCP Client function, so as to perform the IP address allocation and acquisition processing in M415. After the allocation of the IP address has been completed, the processing proceeds to step S509. In step S509, the camera 101 and the camera 102 are controlled by the respective control units 206 to perform the image transfer service in M416.

When the image transfer service as the service communication has been completed, the processing proceeds to step S510. In step S510, the service execution determination unit 217 determines whether another service is being executed in the wireless network for the completed service. In a case where another service is being executed (YES in step S510), the camera 101 (102) simply ends the service communication processing for the completed service. Naturally, the service being executed will be executed continuously. In a case where another service is not being executed (NO in step S510), the processing proceeds to step S511. In step S511, the camera 101 (102) performs the wireless LAN disconnection processing of the wireless network for the completed service. In the present exemplary embodiment, since both the camera 101 and the camera 102 are not executing another service in the wireless LAN network 104 where the service has just been completed, in M418, the camera 101 and the camera 102 perform the wireless LAN disconnection processing to cancel the wireless LAN network 104.

In a same manner as described above, when the print service as the service communication has been completed, the camera 101 and the printer 103 also perform the determination processing in step S510 and the wireless LAN disconnection processing in step S511, so as to cancel the wireless LAN network 105.

Figure 7:
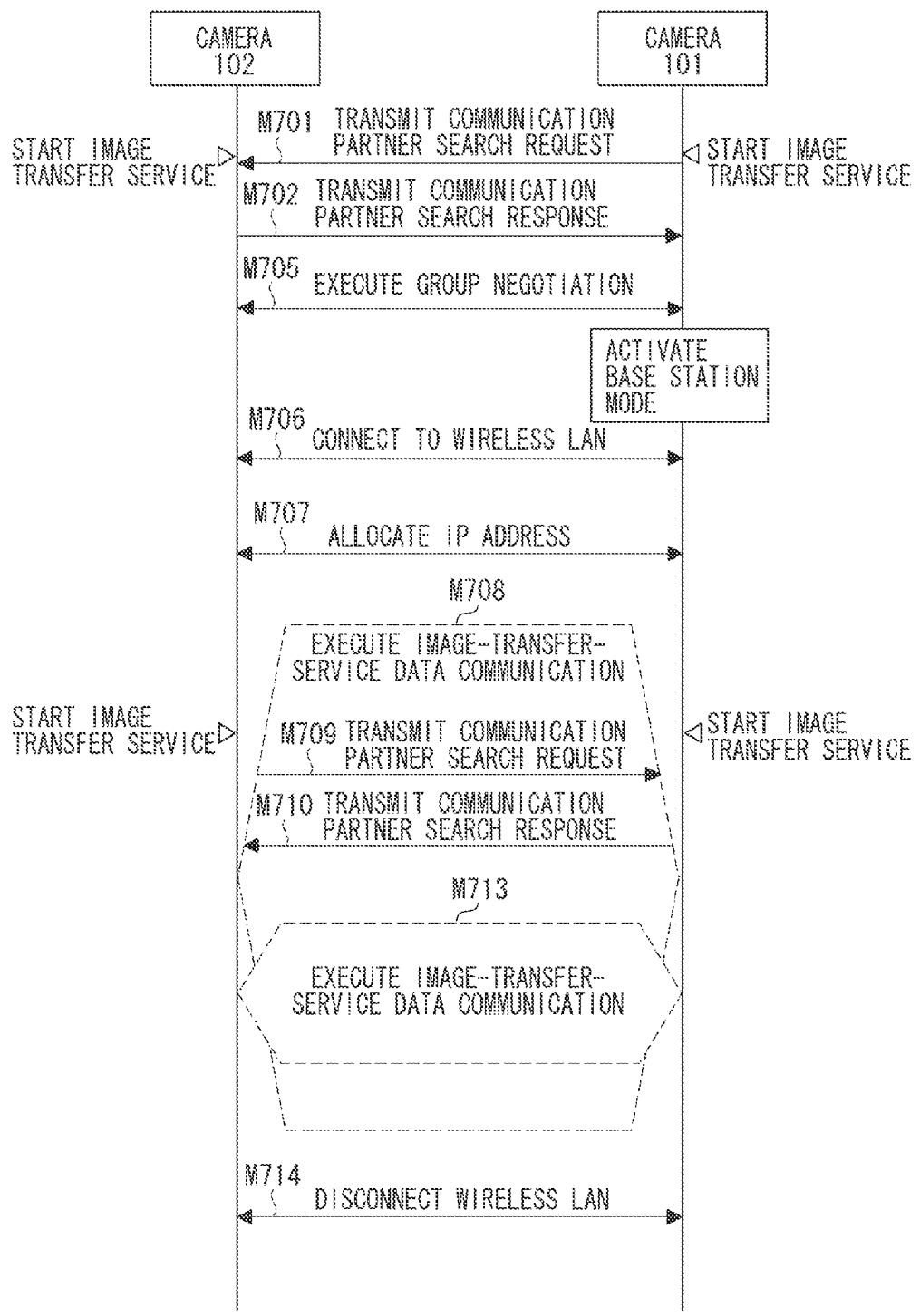
FIG. 7 is a sequence diagram illustrating respective communication services executed by the camera 101 and the camera 102.

Next, another example will be described with reference to FIG. 7. FIG. 7 is a sequence diagram of a plurality of service communications performed by the camera 101 and the camera 102 according to the present exemplary embodiment.

In FIG. 7, in order to transfer the image from the camera 101 to the camera 102, the camera 101 and the camera 102 start the image transfer service. The processing performed in M701 through M708 is the same as the processing described in the above, and thus the description thereof will be omitted. The camera 101 operates as a GO and activates the base station mode to establish the wireless LAN network 104.

While the camera 101 and the camera 102 are executing the image transfer service in M708, the camera 101 and the camera 102 start another image transfer service in order to transfer the image from the camera 102 to the camera 101.

In this case, after the camera 101 and the camera 102 perform the processing in steps S501 through S503, in step S504, the service execution determination units 217 determine that the camera 101 and the camera 102 are executing another service. Therefore, in step S505, the wireless network formation determination units 214 perform the wireless network formation determination processing. In step S601, in the wireless network formation determination processing, the wireless network formation determination units 214 determine that the communication partner apparatus for the service to be started and the communication partner apparatus for the service being executed are the same (YES in step S601). Therefore, the processing proceeds to step S603. In step S603, the wireless network formation determination units 214 determines that a new wireless network for the second image transfer service is not to be formed.

Based on the wireless network formation determination processing, in step S506, in a case where the wireless network formation determination units 214 determine that the new wireless network (NO in step S506) is not to be formed, the processing proceeds to step S509. In step S509, the camera 101 and the camera 102 are controlled by the control units 206 to start the service communication. In the present exemplary embodiment, since the camera 101 and the camera 102 have determined that a new wireless network is not to be formed, the camera 101 and the camera 102 advance the processing to step S509 to perform the image transfer service in M713. After the camera 101 and the camera 102 end the second image transfer service started later in M713, the processing proceeds to step S510. In step S510, since the camera 101 and the camera 102 are executing another (i.e., first) image transfer service in M708, the first image transfer service started earlier is continuously performed while the second image transfer service is completed. The wireless LAN network 104 will be canceled when the camera 101 and the camera 102 end the first image transfer service in M708.

In the present exemplary embodiment, one example for forming a new network has been described. In the example, the communication apparatus forms a new network for executing the first communication service according to the partner apparatus of the first communication service in a case where the communication apparatus starts the first communication service while the communication apparatus and the partner apparatus for the second communication service are executing the second communication service. However, the same control is applicable to the case where the communication apparatus starts another service when one service has been ended but the wireless network therefor is still in connection.

As described above, the communication apparatus can autonomously control the maintenance and establishment of the wireless LAN network while taking the communication partner for the service and a state of the formed wireless LAN into consideration, and thus convenience of the user can be improved.

In the first exemplary embodiment, a configuration in which the camera 101 and the printer 103, and the camera 101 and the camera 102 are respectively present in different wireless LAN networks has been described. In a second exemplary embodiment, a configuration in which the camera 101, the camera 102, and the printer 103 communicate with each other in a same wireless LAN network 801 will be described.

In the present exemplary embodiment, functional block diagrams for the camera 101, the camera 102, and the printer 103 are the same as those illustrated in FIG. 2 and FIG. 3, so that the description thereof will be omitted.

Hereinafter, content of the processing according to the present exemplary embodiment will be described with reference to FIGS. 5, 6, 8, and 9.

Figure 9:
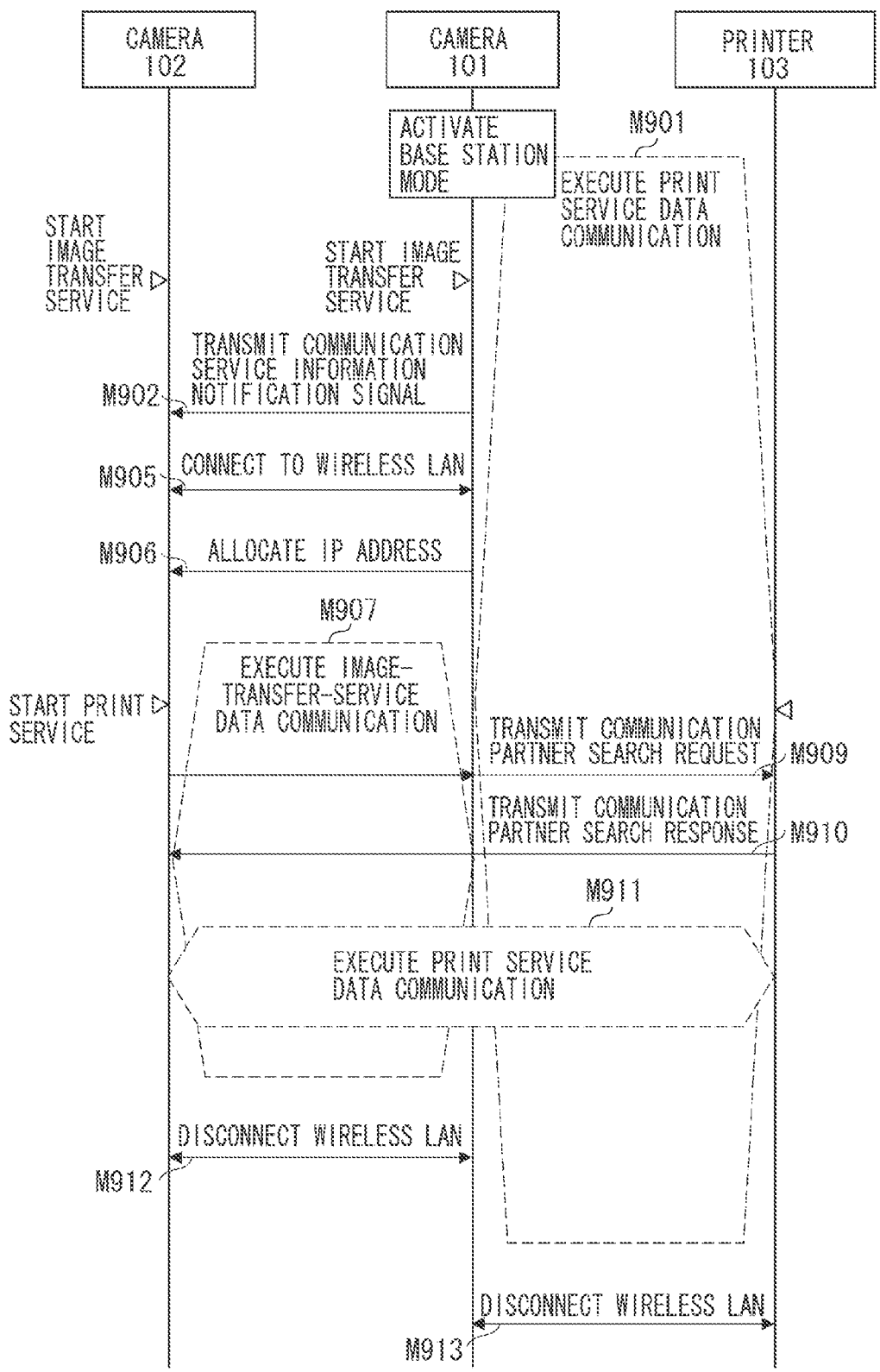
FIG. 9 is a sequence diagram illustrating respective communication services executed by the camera 101, the camera 102, and the printer.

FIG. 9 is a sequence diagram of each apparatus according to the present exemplary embodiment.

First, the camera 101 and the printer 103 have already formed the wireless LAN network 801, and the camera 101 operating as a GO is activating the base station mode. Further, the camera 101 and the printer 103 are executing a print service in M901. The camera 102 has not connected to the wireless LAN network 801.

At this time, the camera 101 and the camera 102 start an image transfer service to transfer an image from the camera 102 to the camera 101.

In the present exemplary embodiment, since the camera 101 have been activated as the GO, in M902, the camera 101 transmits a notification signal such as a beacon which includes the information indicating the start of image transfer service. Further, in M902, the camera 101 also transmits a notification signal such as a beacon which includes the information indicating that the image transfer service is being executed. A probe response to a probe request serving as a signal for searching the wireless network may be transmitted, include the information indicating that the service is started or being executed.

In step S502, after the image transfer service has been started, the communication partner information acquisition unit 215 of the camera 102 receives the notification signal in M902 and acquires the communication partner information.

Thereafter, the processing proceeds to steps S503 and S504. In step S504, the service execution determination unit 217 of the camera 102 determines that another communication service is not being executed (NO in step S504), and advances the processing to step S507. In step S507, the wireless network formation unit 211 performs the Wi-Fi Direct connection processing. In the Wi-Fi Direct connection processing, since the camera 101 has already operated as the GO and established the wireless LAN network 801, in M905, the camera 102 is controlled by the terminal mode operation unit 213 to connect to the wireless LAN network 801 as a Client. Thereafter, the DHCP Client unit 220 of the camera 102 performs the IP address allocation processing in M906, so that the image transfer service is started under control of the control unit 206.

In the present exemplary embodiment, the camera 102 and the printer 103 have started the print service.

In M909, the camera 102 transmits a communication partner search request when the print service is started. Since the printer 103 has also started the print service, In M910, the printer 103 transmits a communication partner search response as a response to the communication partner search request of M909. In a same manner as that in the first exemplary embodiment, the camera 102 and the printer 103 perform the above processing by employing the service discovery function of Wi-Fi Direct.

In step S504, since the service execution determination units 217 and 317 determine that the camera 102 is executing the image transfer service with the camera 101 and the printer 103 is executing the print service with the camera 101, the camera 102 and the printer 103 advance the processing to step S505.

In step S505, the wireless network formation determination processing is performed. In step S602, since the wireless network formation determination units 214 and 314 determine that both the camera 102 and the printer 103 are present in the same wireless LAN network (YES in step S602), the processing proceeds to step S603. Then, in step S603, the wireless network formation determination units 214 and 314 determine that a new wireless network is not to be formed.

Thereafter, the processing proceeds to step S509. In step S509, the camera 102 and the printer 103 executes the print service of M911 via the camera 101 operating as the GO.

After the print service of M911 has been completed, the service communication processing flow is simply ended since the camera 101 and the printer 103 are executing the image transfer service of M907 and the print service of M901 respectively.

When the image transfer service of M907 is completed, in step S511, the camera 102 performs the wireless LAN disconnection processing since another service is not being executed. In the wireless LAN disconnection processing, the camera 102 disconnects and separates from the wireless LAN network 801 established by the camera 101. The camera 101 continues the established wireless LAN network 801 since the camera 101 is still executing the print service of M901 with the printer 103.

When the print service of M901 has been completed, in step S511, the camera 101 and the printer 103 perform the wireless LAN disconnection processing to cancel the wireless LAN network 801 since both the camera 101 and the printer 103 are not executing the other services.

In the present exemplary embodiment, the camera 101 and the printer 103 have already formed the wireless LAN network 801. However, it may not be necessary that the camera 101 and the printer 103 have formed the wireless LAN network 801. In such a case, after receiving an instruction for starting the print service, the printer 103 may notify the information indicating that the printer 103 supports the print service. After receiving the instruction for starting the print service, the printer 103 may also notify the information indicating that the printer 103 is starting or executing the print service.

As described above, the communication apparatus autonomously controls the maintenance and establishment of the wireless LAN network and performs the service in a same wireless network by using the existing wireless LAN network. Therefore, the wireless LAN network can be operated in an efficient manner.

In the first and the second exemplary embodiments, the communication apparatus determines whether to form a new wireless network according to the result acquired through the wireless network formation determination processing.

Figure 8:
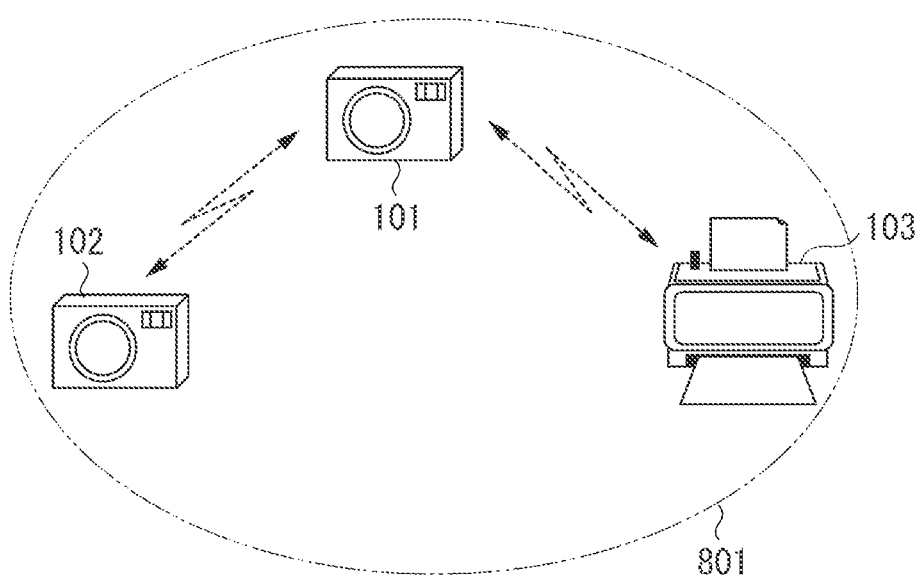
FIG. 8 is a diagram illustrating a configuration of a network.

In a third exemplary embodiment, communication service control which enables the communication apparatus to execute the communication service only when the communication apparatus is directly connecting to each other, will be described with reference to FIG. 8 and the flowchart of FIG. 10.

In step S1001, the printer 103 receives a communication service start request transmitted from the camera 101. Next, in step S1002, the printer 103 determines whether the communication partner apparatus in direct connection is the same as the communication partner apparatus that transmits the communication service start request. The printer 103 makes the above determination based on the communication partner information comparison processing performed by the communication partner information comparison units 216 and 316. In a case where the printer 103 determines that the camera 101 is in direct communication and also the same as the communication partner apparatus that transmits the communication service start request (YES in step S1002), the printer 103 advances the processing to step S1004. In step S1004, the printer 103 accepts the start request from the camera 101 to start the communication service. On the other hand, in a case where the printer 103 determines that the communication partner apparatuses are not the same (NO in step S1002), the printer 103 advances the processing to step S1003. In step S1002, in a case where the camera 102 transmits a communication service request via the camera 101, the printer 103 determines that the communication partner apparatuses are not the same and the printer 103 advances the processing to step S1003.

In step S1003, the printer 103 determines whether the communication partner apparatus that transmits the communication service start request (in this case, the camera 102) is present in the same wireless network but in indirect communication. In a case where the camera 102 is present in the same wireless network (YES in step S1003), the processing proceeds to step S1006. In step S1006, the printer 103 informs the camera 102 that the communication service is only allowed through direct communication since the camera 102 is present in the same wireless network group. On the other hand, in a case where the camera 102 is not present in the same wireless network (NO in step S1003), the processing proceeds to step S1005. In step S1005, the printer 103 transmits a rejection response to the camera 102.

When the camera 102 is informed that the communication service is only allowed through direct communication, the camera 102 displays an error message notifying the user that the service can only be executed by directly communicating with the printer 103. The user confirms the error message, and operates the camera 102 and the printer 103 to make the camera 102 and the printer 103 communicate directly with each other.

As described above, when the wireless network for connecting a plurality of apparatuses has been established, the camera 101 operating as the GO does not have to provide the indirect communication service function if the communication service is only allowed through direct communication. Thus, the GO does not have to activate the useless wireless network for an irrelevant communication service, and thus the power consumption can be lowered efficiently.

In addition, according to the above-described exemplary embodiments, the communication apparatus can execute the service in an efficient manner. For example, the communication apparatus can be provided with a function for autonomously controlling the establishment of the network. Further, the communication apparatus can be prevented from establishing the network in an overlapping manner. Furthermore, the communication apparatus can control execution, rejection, and a user notification of the service in the network.

In the present exemplary embodiment, the wireless communication of the camera and the printer employing the wireless LAN compliant with the IEEE 802.11 has been described. However, the wireless communication is not limited thereto. For example, the wireless communication may be performed by employing wireless communication media such as a wireless universal serial bus (USB), Multi Band OFDM Alliance (MBOA), Bluetooth (registered trademark), an ultra-wideband (UWB), and ZigBee which is near field communication.

Further, in the present exemplary embodiment, the infrastructure mode has been described as a communication mode of the wireless LAN. However, the wireless LAN communication can be also performed in the ad hoc mode. Further, the UWB includes the wireless USB, Wireless 1394, and WiNet.

According to the present invention, a storage medium storing a computer program of the software that realizes the above-described functions may be supplied to the system or the apparatus. In this case, a computer such as a central processing unit (CPU) or a micro processing unit (MPU) of the system or the apparatus reads and executes the program code stored in the recording medium. The computer program itself that is read from the storage medium realizes the functions described in the above exemplary embodiments, and thus the storage medium storing the computer program constitutes the present invention.

The followings can be used as a storage medium for supplying the computer program. For example, a flexible disk, a hard disk, an optical disk, a magneto-optical disk, a compact disc read only memory (CD-ROM), a compact disc recordable (CD-R), a magnetic tape, a non-volatile memory card, a ROM, and a digital versatile disc (DVD) can be used therefor.

The above-described functions may be realized in such a manner that the computer reads and executes the computer program to cause an operating system (OS) operating on the computer to execute all or a part of the actual processing based on the instructions of the program code thereof.

Further, the computer program that is read out from the storage medium may be written into a function expansion board inserted into the computer, or a memory included in a function expansion unit connected to the computer. Then, the CPU included in the function expansion board or the function expansion unit executes all or a part of the actual processing based on the instructions of the program code.

According to present invention, the communication apparatus can execute the service in an efficient manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-012139 filed Jan. 25, 2013, which is hereby incorporated by reference herein in its entirety.

What is claimed is:

1. A communication apparatus comprising:
an identification unit configured to identify a partner apparatus for a first communication service; and
a formation unit configured to form a new network for executing the first communication service according to the partner apparatus for the first communication service in a case where the communication apparatus starts the first communication service while the communication apparatus and a partner apparatus for a second communication service are executing the second communication service; and
an execution unit configured to execute the first communication service,
wherein, according to the partner apparatus for the first communication service, the execution unit executes the first communication service by using a network in which the second communication service is being executed,
wherein the execution unit executes the first communication service by using the network in which the second communication service is being executed in a case where the partner apparatus for the first communication service and the partner apparatus for the second communication service are the same.

2. The communication apparatus according to claim 1, wherein the formation unit performs processing for determining an apparatus that operates as a base station from among the communication apparatus and the partner apparatus for the first communication service.

3. The communication apparatus according to claim 1, wherein the formation unit forms a new network for executing the first communication service according to a network in which the partner apparatus for the first communication service is present.

4. The communication apparatus according to claim 1, wherein the formation unit forms a new network for executing the first communication service in a case where the partner apparatus for the first communication service and the partner apparatus for the second communication service are not present in a same network.

5. The communication apparatus according to claim 1, wherein the formation unit forms a new network for executing the first communication service in a case where the partner apparatus for the first communication service is not present in a network in which the partner apparatus for the second communication service is present.

6. The communication apparatus according to claim 1, wherein the communication apparatus executes a communication service through wireless communication.

7. The communication apparatus according to claim 1, wherein the communication apparatus performs wireless communication compliant with the IEEE 802.11 standard.

8. A non-transitory computer readable storage medium storing a computer program for causing a computer to function as the communication apparatus according to claim 1.

9. A communication apparatus comprising:
an identification unit configured to identify a partner apparatus for a first communication service; and
a formation unit configured to form a new network for executing the first communication service according to the partner apparatus for the first communication service in a case where the communication apparatus starts the first communication service while the communication apparatus and a partner apparatus for a second communication service are executing the second communication service; and
an execution unit configured to execute the first communication service,
wherein, according to the partner apparatus for the first communication service, the execution unit executes the first communication service by using a network in which the second communication service is being executed,
wherein the execution unit executes the first communication service by using the network in which the second communication service is being executed in a case where the partner apparatus for the first communication service and the partner apparatus for the second communication service are not present in a same network.

10. A communication apparatus comprising:
an identification unit configured to identify a partner apparatus for a first communication service; and
a formation unit configured to form a new network for executing the first communication service according to the partner apparatus for the first communication service in a case where the communication apparatus starts the first communication service while the communication apparatus and a partner apparatus for a second communication service are executing the second communication service;
an execution unit configured to execute the first communication service;
a confirmation unit configured to confirm whether the communication apparatus is executing another communication service when the communication apparatus starts the first communication service; and
a determination unit configured to determine whether to form a new network for executing the first communication service in a case where the communication apparatus is executing another communication service when the communication apparatus starts the first communication service,
wherein, according to the partner apparatus for the first communication service, the execution unit executes the first communication service by using a network in which the second communication service is being executed.

11. A communication apparatus comprising:
an identification unit configured to identify a partner apparatus for a first communication service; and
a formation unit configured to form a new network for executing the first communication service according to the partner apparatus for the first communication service in a case where the communication apparatus starts the first communication service while the communication apparatus and a partner apparatus for a second communication service are executing the second communication service;
an execution unit configured to execute the first communication service; and
a determination unit configured to determine whether the communication apparatus is executing another communication service when the communication apparatus ends a communication service,
wherein, according to the partner apparatus for the first communication service, the execution unit executes the first communication service by using a network in which the second communication service is being executed.

12. A communication apparatus comprising:
a determination unit configured to determine a partner apparatus for a first communication service; and
an execution unit configured to execute the first communication service according to the partner apparatus for the first communication service and a partner apparatus for a second communication service in a case where the communication apparatus starts the first communication service while the communication apparatus and the partner apparatus for the second communication service are executing the second communication service,
wherein the determination unit determines whether the partner apparatus for the first communication service and the partner apparatus for the second communication service are the same.

13. The communication apparatus according to claim 12, further comprising:
an acquisition unit configured to acquire partner information of the partner apparatus for the first communication service and/or partner apparatus for the second communication service;
wherein the acquisition unit transmits a request that includes at least information of the second communication service and acquires the partner information based on a response from the partner apparatus for the first communication service and/or partner apparatus for the second communication service.

14. The communication apparatus according to claim 12, further comprising:
an acquisition unit configured to acquire information of the partner apparatus for the first communication service and/or partner apparatus for the second communication service;
wherein the acquisition unit receives a notification signal that includes information relating to a communication service performed by the partner apparatus for the first communication service and/or partner apparatus for the second communication service and acquires the partner information.

15. The communication apparatus according to claim 12, further comprising:
a notification unit configured to notify information relating to a communication service performed by the communication apparatus by using a notification signal.

16. The communication apparatus according to claim 12, wherein the communication apparatus and a communication partner determine whether the communication apparatus operates as a base station or a terminal station that connects to the base station.

17. The communication apparatus according to claim 12, further comprising:
a second determination unit configured to determine whether the communication apparatus executes the first communication service in a new network.

18. A non-transitory computer readable storage medium storing a computer program for causing a computer to function as the communication apparatus according to claim 12.

19. The communication apparatus according to claim 12, wherein the determination unit determines whether the partner apparatus for the first communication service and the partner apparatus for the second communication service are present in the same network.

20. A control method for a communication apparatus comprising:
- determining a partner apparatus for a first communication service; and
- forming a new network for executing the first communication service according to the partner apparatus for the first communication service in a case where the communication apparatus starts the first communication service while the communication apparatus and a partner apparatus for a second communication service are executing the second communication service; and
- executing the first communication service,
- wherein, according to the partner apparatus for the first communication service, the execution unit executes the first communication service by using a network in which the second communication service is being executed,
- wherein the execution unit executes the first communication service by using the network in which the second communication service is being executed in a case where the partner apparatus for the first communication service and the partner apparatus for the second communication service are the same.

21. A control method for a communication apparatus comprising:
- determining a partner apparatus for a first communication service; and
- executing the first communication service according to the partner apparatus for the first communication service and a partner apparatus for a second communication service in a case where the communication apparatus starts the first communication service while the communication apparatus and the partner apparatus for the second communication service are executing the second communication service,
- wherein the determining whether the partner apparatus for the first communication service and the partner apparatus for the second communication service are the same.

22. A communication apparatus comprising:
- a determination unit configured to determine a partner apparatus for a first communication service; and
- an execution unit configured to execute the first communication service according to the partner apparatus for the first communication service and a partner apparatus for a second communication service in a case where the communication apparatus starts the first communication service while the communication apparatus and the partner apparatus for the second communication service are executing the second communication service,
- wherein the communication apparatus executes the first communication service in a first network of a first communication channel and executes the second communication service in a second network of the first communication channel different from the first network.

23. A non-transitory computer readable storage medium storing a computer program for causing a computer to function as the communication apparatus according to claim 22.

24. A control method for a communication apparatus comprising:
- determining a partner apparatus for a first communication service; and
- executing the first communication service according to the partner apparatus for the first communication service and a partner apparatus for a second communication service in a case where the communication apparatus starts the first communication service while the communication apparatus and the partner apparatus for the second communication service are executing the second communication service,
- wherein the communication apparatus executes the first communication service in a first network of a first communication channel and executes the second communication service in a second network of the first communication channel different from the first network.

* * * * *